Aug. 27, 1940.    F. P. SCULLY ET AL    2,212,620
AUDIBLE SIGNALING DEVICE FOR USE WITH TANKS

Filed Nov. 25, 1939

INVENTORS
Frank P. Scully
BY Alcide E. Mathey
Pardey Chittick
ATTORNEY

Patented Aug. 27, 1940

2,212,620

UNITED STATES PATENT OFFICE 2,212,620

AUDIBLE SIGNALING DEVICE FOR USE WITH TANKS

Frank P. Scully, Cambridge, and Alcide E. Mathey, Auburndale, Mass., assignors to Scully Signal Co., East Cambridge, Mass., a corporation of Massachusetts Application November 25, 1939, Serial No. 306,142

6 Claims. (Cl. 137—111)

This invention relates to means for indicating the level of liquid in a tank.

One of the objects of this invention is to provide a simple positive signaling device which will give an audible signal to indicate to the operator in charge of filling a tank when the liquid has risen to a predetermined point therein so that the supply may be cut off in time to prevent overflow.

Many different forms of signaling means have been provided heretofore, but by the particular construction herein set forth there is provided a construction which is simple, cheap and positive in action and which may be set at the time of installation to provide for indication of the liquid level at any desired point, or may be adjusted thereafter to indicate a different level.

Another object of the invention is to incorporate with the signaling means mechanism which at all times provides adequate venting capacity so that in the event of failure of the operator to shut off the supply to the tank, overflow may take place without the development of dangerous pressures.

These and other objects of the invention will become more apparent as the description proceeds with the aid of the accompanying drawing in which.

Figure 1:
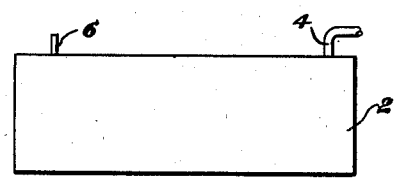
Fig. 1 is a diagrammatic showing of a tank having a filling connection and a venting connection.

Referring now to the drawing, the description of the invention will be given, to be followed by an explanation of the mode of operation.

In Fig. 1 is shown a tank 2 having a filling connection 4 and a venting connection 6. These connections may, of course, be placed at any desired location on the tank and their terminal ends may be at any place found convenient in connection with the installation.

Figure 2:
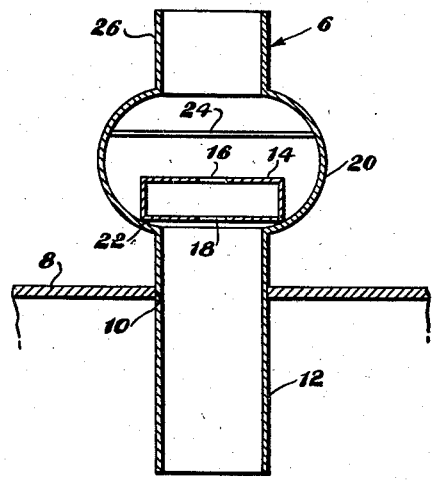
Fig. 2 is a detail in section of one form of the signaling and venting connection.
Figure 3:
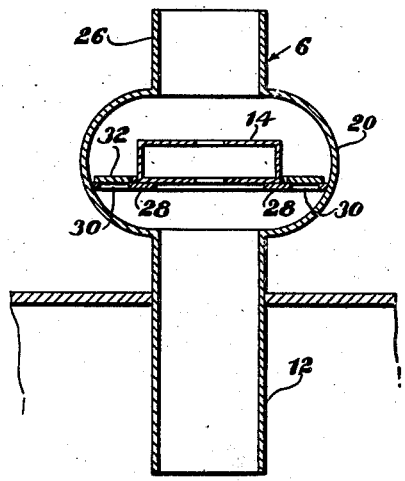
Fig. 3 shows another form of the signaling and venting connection.
Figure 4:
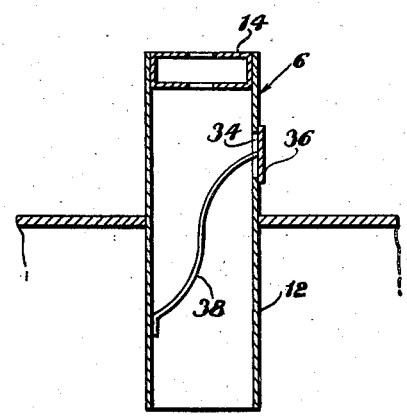
Fig. 4 shows still a further modification.

In Figs. 2, 3 and 4 are shown detailed constructions of the venting connection 6, indicated generally in Fig. 1. In Fig. 2 the top of tank 2 is indicated as at 8 and has a bore therethrough at 10 in which may be positioned the venting connection. The venting connection may be in the form of a tube 12 extending downwardly into the tank through bore 10. The length of tube 12 is determined by the level of the liquid at which it is desired to signal the operator. That is to say, it is contemplated that when the liquid level reaches the lower end of tube 12, the signal will be given, and hence the farther tube 12 extends downwardly into the tank, the lower will be the level when the signal is made. Tube 12 may be fixed or adjustable with respect to the top of the tank 8 by any convenient means, as, for example, either a sliding fit through a packing sleeve or a screw thread connection.

In series with tube 12 is an audible signaling device or whistle, shown as 14 in Fig. 2. This whistle is of the button type, having upper and lower apertures 16 and 18. The whistle is positioned in a housing 20 and rests on the lower portion thereof which forms a seat, as at 22. A stop 24 in the form of a bar extending across the housing is included to limit the upward movement of the whistle should the latter be blown upwardly off the seat.

The upper end of housing 20 is connected to a further extension of venting connection 26 which may terminate at any desired point.

The whistle 14 is light enough so that if an excessive pressure should develop in the tank, the whistle will be raised from seat 22 to permit by-passing of gas about the whistle, thereby increasing the venting capacity to the necessary degree. Such movement upwardly of the whistle does not, however, affect the audibility of the device, as under such circumstances there will be a sufficient pressure differential between the upper and lower sides of the whistle to insure the passage of an adequate volume of gas therethrough to produce an audible sound.

The construction disclosed in Fig. 3 is in general the same as that of Fig. 2, but differs in that the whistle 14 is fixedly mounted on a support 28 which in turn is fixed to the housing 20. The whistle is thereby rendered immovable within the housing. However, surrounding the whistle is a series of ports 30 for the purpose of providing increased venting capacity in the event of excess pressures in the tank. Ports 30 are normally held closed by the annular valve 32 which is gravitationally maintained thereover.

In the construction of Fig. 3 venting gas will normally pass through the whistle to produce a sound. Under the development of excess pressure valve 32 will be forced upwardly from its seat over ports 30, thereby opening the latter to provide increased venting capacity as may be needed. In such event, however, the audibility of whistle 14 is maintained due to the pressure differentials on the opposite sides of the whistle.

In the construction shown in Fig. 4 the auxiliary port, which provides for increased venting capacity, is in the form of an opening 34 in the side of the vent pipe outside of the tank but between the tank and whistle 14. This opening is normally closed by a valve 36 held in position by spring 38. Under conditions of excess pressure valve 36 will be forced outwardly from its seat, thereby opening port 34 to provide the increased venting capacity that may be needed.

The devices operate as follows. Liquid enters the tank through filling connection 4 and the displaced gas is vented from the tank through venting connection 6. As soon as filling commences, gas will pass through whistle 14, immediately producing an audible sound that may be heard by the operator. Filling continues and the audible sound continues until such time as the liquid rises to the lower end of tube 12. When the liquid level reaches this point and seals the lower end of tube 12, the whistling is discontinued, as the gas at the top of the tank can no longer escape therefrom. As filling continues thereafter, the gas trapped in the top of the tank is gradually compressed, forcing the liquid upward through tube 12. At first this upward movement after the trapping of the lower end of tube 12 is slow because of the low pressure of the trapped gas. Gradually, however, as additional liquid is put into the tank, the pressure of the trapped gas increases, with the result that upward movement of the liquid in tube 12 will be accelerated.

In due time, therefore, if the supply is not cut off, the liquid will advance upwardly at such a rate that the gas ahead of it in tube 12 will be driven through the whistle rapidly enough to produce again an audible sound, until the liquid reaches the whistle, after which whistling again ceases and overflow may take place.

However, the time between the initial trapping of the lower end of tube 12 when the whistle is first cut off and the recommencing of the whistle thereafter is appreciable and sufficient to enable the operator to cut off the supply before overflow takes place.

Obviously, by varying the volume of the trapped gas at the top of the tank, which may be done by changing the length of tube 12 or altering the configuration of the top of the tank itself, the time from cessation to recommencement of the whistle may be varied as desired for a given rate of fill.

If, through accident or mistake, the operator fails to shut off the supply, ultimately the tank will overflow through the venting connection 6, but due to the provision of bypasses of adequate capacity about the whistle, the venting capacity is not restricted to the size of the apertures 16 and 18 through the whistle, so that safe conditions within the tank will prevail at all times.

By this invention there is provided a simple means for giving an audible signal to indicate the level of liquid in a tank and at the same time to have available adequate venting capacity to insure safe operating conditions, both during and after filling.

While preferred forms of the invention have been shown, it is to be distinctly understood that the invention is not to be limited thereby, but only by the appended claims.

We claim:

1. Means for indicating the level of liquid in a tank, comprising in combination with a tank a venting connection therefrom, said venting connection comprising a tube fixed with respect to and extending a predetermined distance below the top of said tank and adapted to be trapped by a rising liquid level and through which tube all gas leaving said tank must pass, a whistle in said venting connection in series with said tube, and bypassing means about said whistle operative at a predetermined pressure.

2. Means for indicating the level of liquid in a tank, as set forth in claim 1, in which said venting connection has a seat formed therein and said whistle is movable and rests on said seat and said by-pass is formed when pressure in excess of a predetermined degree has moved said whistle off said seat.

3. Means for indicating the level of liquid in a tank, as set forth in claim 1, in which said venting connection has a seat formed therein and said whistle is movable and rests on said seat and said by-pass is formed when pressure in excess of a predetermined degree has moved said whistle upwardly off said seat, and stop means for limiting the upward movement of said whistle off said seat at a position of superior venting capacity.

4. Means for indicating the level of liquid in a tank, as set forth in claim 1, said whistle being fixed in said vent passage, ports in said vent passage normally closed by pressure-operated valve means whereby fluid may be bypassed about said whistle under conditions of pressure in excess of a predetermined degree.

5. Means for indicating the level of liquid in a tank, as set forth in claim 1, in which said whistle is fixed in said vent passage, an auxiliary port in said vent passage between the outside of said tank and said whistle, said port being normally closed by a valve but operable to permit the escape of fluid under conditions of pressure in excess of a predetermined degree.

6. Means for indicating the level of a liquid in a tank, including in combination with a tank a vent passage, said vent passage comprising a tube having its lower end a predetermined distance below the top of said tank whereby the lower end will be trapped upon the liquid level rising thereto, the volume of gas remaining in the tank after the lower end of said tube has been trapped being sufficient to insure a slow upward movement of liquid in said tube for a period adequate to allow shutting off the supply of liquid to said tank, a whistle in said venting passage audible during filling of said tank and inaudible for an appreciable period after the lower end of said tube has been trapped by rising liquid, and means for increasing the venting capacity of said vent passage when the pressure within said tank is in excess of a predetermined degree.

FRANK P. SCULLY.
ALCIDE E. MATHEY.